Nov. 30, 1937.　　　　A. J. LIPPOLD　　　　2,100,562
OVERLOAD CLUTCH
Filed July 11, 1936
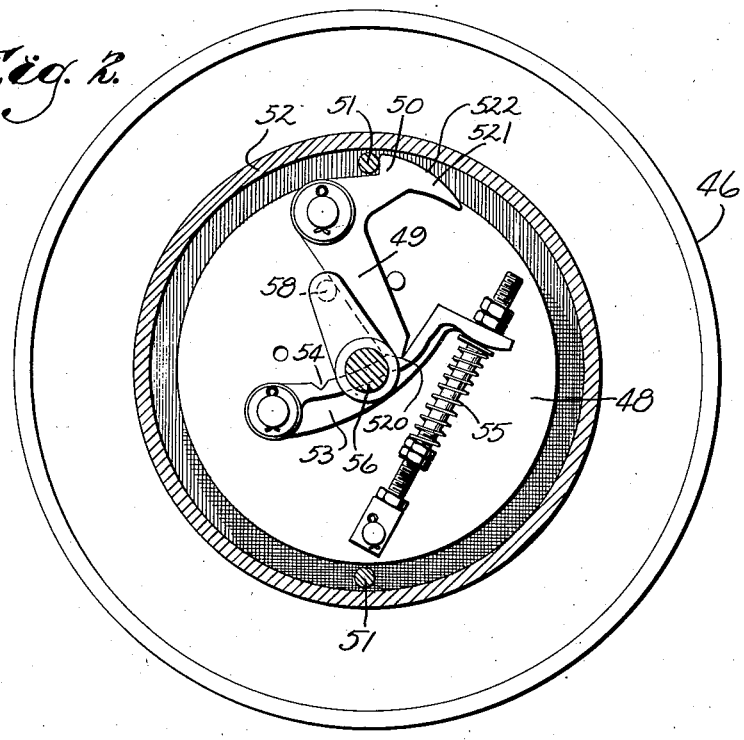
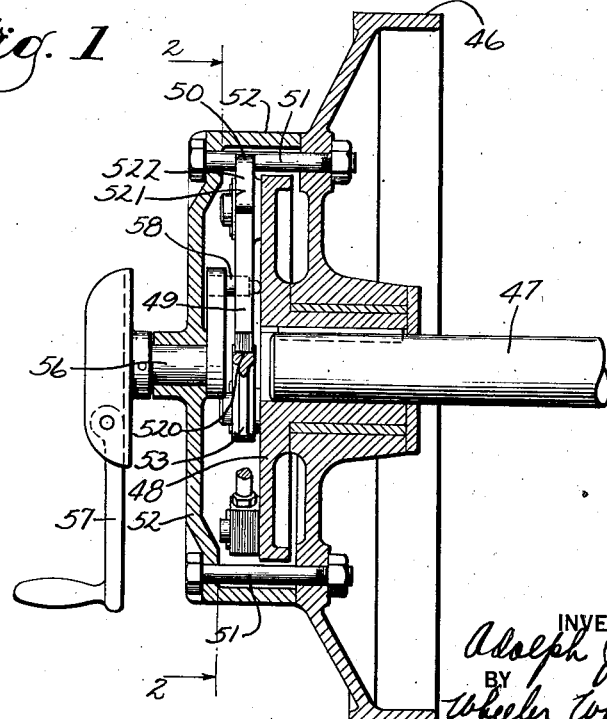
INVENTOR
Adolph J. Lippold
BY
Wheeler, Wheeler & Wheeler
ATTORNEYS Patented Nov. 30, 1937

2,100,562

UNITED STATES PATENT OFFICE 2,100,562

OVERLOAD CLUTCH

Adolph J. Lippold, Milwaukee, Wis., assignor to Cherry-Burrell Corporation, Chicago, Ill., a corporation Application July 11, 1936, Serial No. 90,100

9 Claims. (Cl. 192—56)

My invention relates to improvements in overload clutches.

This application is a continuation in part of my application, Serial Number 7,742, filed February 23, 1935, for a Bottle filling mechanism.

One object of my invention is to provide an overload clutch which is in substantial balance and wherein the movable parts in moving from clutch engaged to clutch released position do not substantially change the inherent balance.

Another object of my invention is to provide in an overload clutch, a coupling lever so shaped that a positive, substantially non-resilient engagement with a driving bolt obtains when the parts are rotated in a forward direction and until actual overload occurs and, on the other hand, so shaped that when the parts are rotated in the opposite direction a camming action therebetween accomplishes a clutch disengaging result.

In the drawing:

Figure 1 is a vertical section through the axis of the driving and driven parts of my overload clutch.

Figure 2 is a section on line 2—2 of Figure 1.

Like parts are designated by the same reference characters throughout the several views.

My overload clutch is an improvement in the class of clutches which are intended to transmit power from driving to driven members under normal driving conditions, but with provision for complete release of engagement of the driving and driven clutch parts to completely disconnect the driving and driven members in the event of an overload whereby excessive torque in the driving connections obtains. Such overload clutches are used in mechanisms where damage due to accidental stoppage of certain driven parts of a machine may be minimized by disconnecting the source of power instantly upon the occurrence of the stoppage.

In the drawing my overload clutch is shown installed as a portion of the primary driving mechanism in a bottle filling mechanism in which a driving motor, not shown, by means of a belt, drives a special pulley 46 on a main drive shaft 47 to the driven mechanism, this pulley 46 being free to rotate on the drive shaft save for my overload clutch, which is automatically releasable to prevent damage to the parts when overload occurs.

Made fast to shaft 47 is a clutch plate 48 to which is pivoted a coupling lever 49 having a finger 50 adapted in the position shown in Figure 2 to receive driving thrust from a driving bolt 51 which holds a cover plate 52 to the face of the pulley. The coupling lever 49 is normally held in this position by engagement of its pointed end in a notch 520 of a latch lever 53 which also has another notch 54 near its fulcrum. Latch lever 53 is also pivoted to the plate 48 and is subject to an adjustable degree of pressure from a compression spring 55 which tends to maintain latch lever 53 in such a position as to anchor the end of coupling lever 49.

In the event of overload the thrust of driving bolt 51 on the finger 50 of coupling lever 49 causes the pointed end 49 of the lever to subject latch lever 53 to a camming action which overcomes the compression of spring 55 and allows coupling lever 49 to spring over into engagement with notch 54, thereby freeing finger 50 from the driving bolt 51 and allowing the pulley to turn freely.

It will be noted that the coupling lever is pivotally mounted adjacent the periphery of plate 48 and that the long arm of the coupling lever extends, in normal driving or clutch engaged position, slightly offset from the radius of the plate 48, whereas in clutch released position the coupling lever is oscillated to a position slightly offset from said radius on the other side of the axis, thus maintaining the clutch parts in substantially equivalent balance.

Likewise, it will be noted that the latch lever 53 is in the position of a chord across the plate 48 and in either clutch engaged or clutch released position is maintained in balance.

In many machines with which my overload clutch may be equipped, damage may not only result from an overload due to a stoppage of driven parts, but may likewise result if, accidentally, the pulley 46 is rotated under power in the wrong direction. If the device as illustrated is driven primarily by the pulley 46, it is intended to turn in a clockwise direction as viewed in Fig. 2.

Rotation of the pulley 46 in a counterclockwise direction might occasion damage to the parts in the event of overload but for the provision, as a part of the coupling lever 49 of a horn 521 which is provided with a cam surface 522 to contact driving bolts 51 to accomplish the same displacement of the coupling lever 49 as would be accomplished by an excessive torque between the finger 50 and one of the driving bolts 51. Reverse rotation of the pulley 46 will therefore swing the coupling lever into notch 54 and disconnect the driving from the driven parts.

If the machine with which my overload clutch is equipped, is stopped, the overload clutch can readily be reset by means of a rock shaft 56 having an exterior hand crank at 57 and an interior crank pin 58 which is so located that it bears against the lever 49 in a direction to move that lever from notch 54 back to its original position in notch 520.

My overload clutch is adapted to maintain a positive non-resilient drive between the pulley 46 and the plate 48, for it will be apparent to those skilled in the art that the "leverage" between the comparatively short finger 50 and the comparatively long arm of the coupling lever 49 is such that in view of the sharply inclined walls of the notch 520, no movement of the lever 49 in the event of heavy torque, will be accomplished until the point of actual overload is reached. Then, as indicated from my experience with my overload clutch, the lever is quickly and positively snapped out of the notch 520 and the parts immediately assume a free running position.

My invention is therefore to be particularly distinguished from those types of overload clutch in which a resilience of drive is provided and some such resilient member as a spring is constantly flexed almost to the point of release of the drive and any slight increase in torque will cause such release.

My device is likewise to be distinguished from that type of overload clutch in which a displacement of the driving connections by excessive torque immediately unbalances the members. My overload clutch is therefore suited to any installation where the clutch parts such as those shown upon the plate 48 may comprise driving as well as driven members and may continue to rotate rapidly, without vibration, after the driving connection has been released.

My improved clutch will transmit motion with equal facility and will operate to release the driving coupling in exactly the same manner whether the pulley 46 or the shaft 47 represents the source of power, provided the relative direction of rotation in either case is such as to effect engagement between the bolt 51 and finger 50 as shown in Fig. 2.

I claim:

1. In a device of the character described, the combination with a driven member comprising a disk and a driven shaft upon which said disk is fixed, of a driving pulley encircling said disk and comprising a driving member adjacent the face of the disk, a lever pivoted to the face of the disk and provided with a spring thrusting its end toward the center of the disk, a second lever pivoted adjacent the periphery of the disk and having one end engaged with said driving member and the other end engaging the first lever to receive under compression the thrust of the spring thereon, said first lever being notched to receive the end of the second lever and being provided with a second notch adjacent its pivot into which the end of the second lever is receivable when the thrust of said driving member becomes excessive, said driving member being released by said second lever when said second lever moves to engage the second notch of the first lever, together with means for resetting said second lever to re-establish a driving connection from said pulley to said driven member, said means comprising a closure carried by said pulley and a manually operable crank carried by said closure and having a portion positioned adjacent said disk in the path of said second lever for engagement therewith in a direction to restore it to said first notch.

2. An overload clutch through which motion may be transmitted from either of two members to the other, said clutch comprising the combination with driving and driven members rotatable substantially about a common axis, one of said members having a fixed coupling part, of a coupling element movably connected with the other of said members and engageable with said part, detent means pivoted to said other member at one side of said axis and extending across said axis for engagement with said coupling element to maintain it normally in engagement with said part, and means biasing said detent means toward said element and yieldable to a position for the release of said element, whereby to permit disengagement thereof from said part, said coupling element and detent means being so disposed and mounted upon said second member as to maintain substantial balance of said member at all times irrespective of which of said members is primarily driven and irrespective of whether said coupling element and coupling part are engaged in driving relation.

3. In an overload clutch in which either of two members may be primarily driven to actuate the other, the combination with one of said members having a coupling part, of a coupling lever in pivotal connection with the other of said members and movable to and from a coupling engagement with said part, a detent engageable with the lever in the coupling position thereof and biased against release from such engagement, said detent and lever having cam surfaces arranged to release said lever from said detent when the device is overloaded, together with means mounted upon one of said members and provided with a crank engageable with said lever in a direction to re-engage it with said detent and said part to re-establish a driving connection between said members.

4. In a device of the character described, the combination with driving and driven members rotatable substantially upon a common axis, one of said members having a coupling lever pivotally mounted adjacent its periphery and extending substantially radially thereof but slightly offset at its free end from said axis, a part carried by the other of said members and interlockingly engaged with said coupling lever in the aforesaid position thereof, said coupling lever being adapted to release said part upon movement of its free end across said axis, a latch lever pivoted to the member carrying the coupling lever and having its fulcrum at one side of said axis, said latch lever being yieldably engageable with the coupling lever to retain it yieldably in its normal position of engagement with said part, and a spring acting on the free end of said latch lever for yieldably maintaining it pressed toward the end of said coupling lever.

5. In a device of the character described, the combination with driving and driven members rotatable substantially upon a common axis, one of said members having a coupling part and the other being provided with a pivoted lever having a finger portion engaging said part and releasable therefrom upon oscillation of said lever, the part-engaging position of said lever being almost radial at one side of said axis and the part releasing position of said lever being almost radial at the other side of said axis, a detent lever pivoted to said other member at one side of the axis thereof and having its free end portion extending across said axis to the other side thereof, and spring means acting on the free end of said detent lever in a direction to urge it yieldably toward said coupling lever, said coupling lever and detent lever being formed for yieldable interaction at each of the two positions aforesaid of the coupling lever, whereby said detent lever will releasably tend to maintain the coupling lever in said respective positions.

6. The combination with driving and driven members rotatable substantially on the same axis, of a coupling part connected with one of said members, a coupling lever pivoted to the other and provided with a complementary coupling finger movable to and from operative motion transmitting engagement with said coupling part in the movement of said coupling lever, detent means for releasably maintaining said lever normally in a position in which said coupling finger and coupling part are engaged for motion transmission, and cover means mounted on the member carrying said coupling part and enclosing the other of said members and said coupling means and detent means, and a resetting device rotatably mounted in said cover and provided with an exterior handle and with interior means for acting on said lever in a direction to adjust it to its coupled position.

7. The combination with driving and driven members rotatable substantially on the same axis, of a coupling part connected with one of said members, a coupling lever pivoted to the other and provided with a complementary coupling finger movable to and from operative motion transmitting engagement with said coupling part in the movement of said coupling lever, detent means for releasably maintaining said lever normally in a position in which said coupling finger and coupling part are engaged for motion transmission, and cover means mounted on the member carrying said coupling part and enclosing the other of said members and said coupling means and detent means, and a resetting device rotatably mounted in said cover and provided with an exterior handle and with interior means for acting on said lever in a direction to adjust it to its coupled position, said resetting means comprising a shaft co-axial with said members and a crank within said cover.

8. The combination with driving and driven members rotatable substantially about a common axis, of a coupling part projecting axially from one of said members, a coupling lever pivoted to the other of said members and having a finger portion engageable with said part in the normal position of said lever for the operative transmission of motion between said members in one relative direction of rotation, said coupling lever being pivotally movable to an uncoupling position upon the occurrence of overload in said relative direction of rotation, detent means yieldably resisting movement of said lever from said normal position to said uncoupling position, and cam means carried by said lever for interaction with said part in a reverse direction of relative movement between said members for releasing the coupling between said members upon the occurrence of such reverse relative movement.

9. The combination with driving and driven members rotatable substantially about a common axis, of a coupling part projecting axially from one of said members, a coupling lever pivoted to the other of said members and having a finger portion engageable with said part in the normal position of said lever for the operative transmission of motion between said members in one relative direction of rotation, said coupling lever being pivotally movable to an uncoupling position upon the occurrence of overload in said relative direction of rotation, detent means yieldably resisting movement of said lever from said normal position to said uncoupling position, and cam means carried by said lever for interaction with said part in a reverse direction of relative movement between said members for releasing the coupling between said members upon the occurrence of such reverse relative movement, the finger portion of said lever comprising a shoulder part thereof from which said cam means extends oppositely as a horn.

ADOLPH J. LIPPOLD.